United States Patent [19]

Saunders, IV

[11] Patent Number: 4,700,919
[45] Date of Patent: Oct. 20, 1987

[54] CONNECTOR ASSEMBLY FOR WINDSCREEN ACCESSORIES

[76] Inventor: Charles A. Saunders, IV, Post Office Box 1246, Columbus, Nebr. 68601

[21] Appl. No.: 724,014

[22] Filed: Apr. 17, 1985

[51] Int. Cl.⁴ .............................................. E04G 3/00
[52] U.S. Cl. ........................... 248/288.5; 248/316.6; 248/276; 248/481
[58] Field of Search ................. 248/288.3, 288.5, 481, 248/484, 482, 479, 477, 205.3, 205.4, 276, 288.1, 287, 316.6; 403/97; 296/84 B, 84 C, 91, 78.1, 223, 217

[56] References Cited

U.S. PATENT DOCUMENTS

| | | | |
|---|---|---|---|
| 1,537,039 | 5/1925 | Short | 248/231.8 |
| 1,967,039 | 7/1934 | Mohr | 248/479 |
| 2,123,125 | 7/1938 | Trippe | 248/288.5 |
| 2,147,855 | 2/1939 | Normandin | 296/84 C |
| 2,210,147 | 8/1940 | Griffith | 403/114 |
| 2,419,306 | 4/1947 | Zeller | 248/481 |
| 3,097,882 | 7/1963 | Andrews | 296/91 |
| 4,033,245 | 7/1977 | Derees | 296/84 B |
| 4,085,665 | 4/1978 | Paxton | 296/84 B |
| 4,086,012 | 4/1978 | Buckley | 403/2 |
| 4,087,110 | 5/1978 | Vetter | 296/78.1 |
| 4,121,495 | 10/1978 | Malo | 403/2 |
| 4,247,173 | 1/1981 | Vitaloni | 248/479 |
| 4,379,584 | 4/1983 | Willey | 296/78.1 |
| 4,515,336 | 5/1985 | Fischer | 248/288.3 |

FOREIGN PATENT DOCUMENTS

| | | | |
|---|---|---|---|
| 2702824 | 1/1977 | Fed. Rep. of Germany | 248/205.3 |
| 381194 | 12/1907 | France | 403/97 |
| 951912 | 4/1949 | France | 248/477 |
| 1009157 | 5/1952 | France | 248/316.5 |
| 776177 | 6/1957 | United Kingdom | 403/97 |
| 1182270 | 2/1970 | United Kingdom | 248/481 |

Primary Examiner—Reinaldo P. Machado
Assistant Examiner—Alvin Chin-Shue
Attorney, Agent, or Firm—Edwin L. Spangler, Jr.

[57] ABSTRACT

This invention relates to a novel mounting assembly for adjustably connecting various accessories to the marginal edge of a windscreen of the type found on motorcycles, snowmobiles and the like, such assembly being characterized by a foldable clamshell-type clamp connector having opposed surfaces adapted for attachment in face-to-face relation to opposite faces of a suitable support adjacent an edge thereof, a peripherally-toothed post depending from one leaf of the clamp connector on the opposite face thereof from its support-engaging surface, a rigid arm having one end fitted with an internally-toothed split ring angularly adjustable on the toothed post by means of a ratcheting action and a ball on the other end, a jaw-forming socket for universal movement on the ball and for tightening same thereto to maintain a selected adjusted position, and a second connector depending from the socket for fastening same to an accessory whose position is to be adjusted and maintained relative to the support. The invention is also characterized by the combination of two such assemblies cooperating with one another and with the support so as to interconnect a flexible accessory to the latter while shaping and maintaining a preset contoured relation therebetween.

17 Claims, 5 Drawing Figures

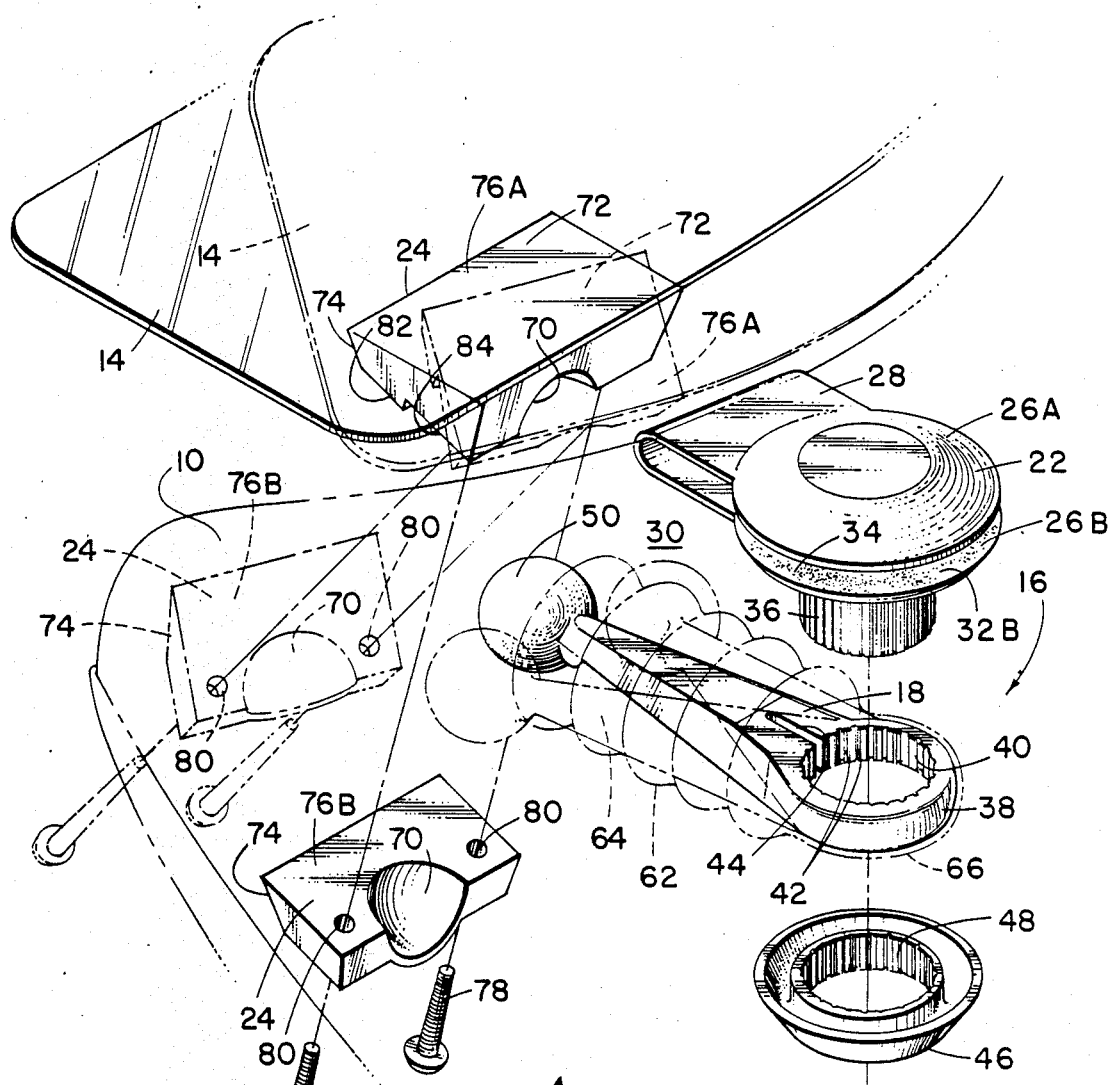
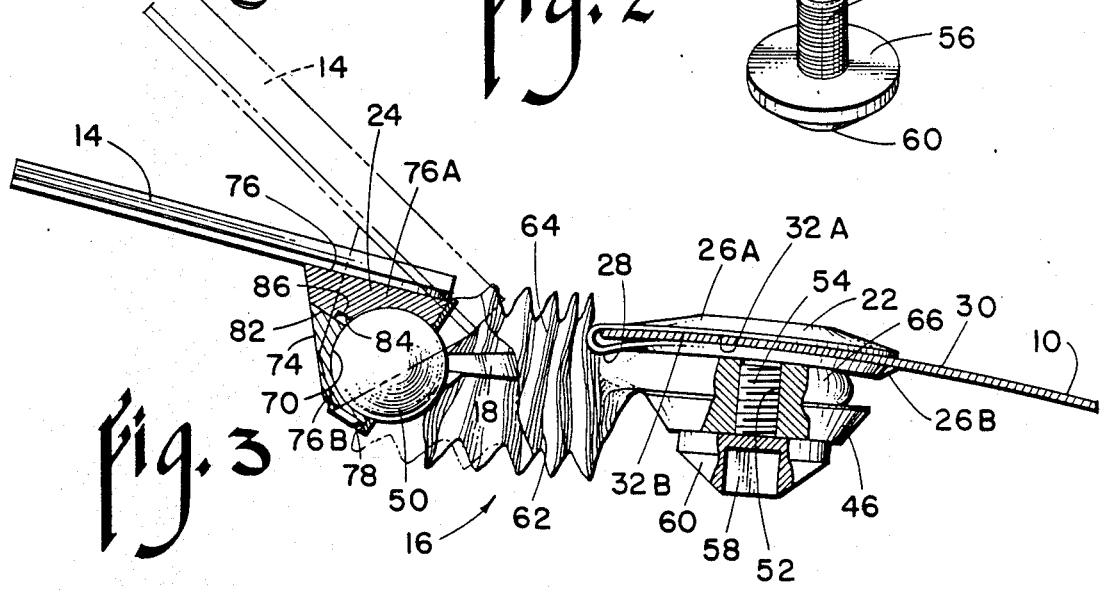
Fig. 2
Fig. 3

CONNECTOR ASSEMBLY FOR WINDSCREEN ACCESSORIES

Windscreens of the type used on motorcycles, snowmobiles and other fast-moving vehicles are, for the most part, fabricated from high-impact plastic materials which can be molded and contoured into complex streamlined shapes selected to offer minimal wind resistance while, at the same time, offering the driver protection from the wind, flying objects and other potentially injurious occurrences. Unfortunately, airstream management is not a static problem which can be satisfactorily handled on a permanent basis by even a well-designed windscreen. Instead, wind and driving conditions, speed, weather, temperature and even the terrain call for adjustments in the manner in which the wind is managed for optimal comfort and performance. For example, as simple a thing as deflecting cold air around the body, particularly the hands, in cold weather versus directing a stream of air over the body in the summer calls for movable extensions adjustably attached to the windscreen that are not currently available insofar as applicant is aware. Proper and efficient air management becomes vastly more complex when such things as turbulence, noise, efficiency and, most especially, control problems are factored in. A rider must, for instance, be able to hear well if he or she is to operate a motorcycle safely on the highway or in traffic. If, therefore, it becomes too noisy to hear properly due to turbulent air conditions existing behind the windscreen caused by an improperly adjusted extension or deflector attached to the trailing edge of the latter, a decidedly unsafe operating condition has been created. Moreover, a two-wheeled vehicle like a motorcycle is, by its very nature, less stable than one having three or more wheels. This means, of course, that any sidewise thrust occasioned by wind currents directed other than essentially head or tail winds can be most dangerous and of considerable concern. While, obviously, such conditions are encountered much of the time the vehicle is being used, nevertheless, the adverse effects of these sidewise air currents can, to some extent at least, be counteracted and diminished by using a carefully adjusted deflector extending behind the trailing edge of the windscreen to set up an air current in opposition thereto. The thing to be avoided, obviously, is the use of such a deflector to set up wind currents that create control problems when none exists naturally.

Preshaped transparent wind deflectors are well known in the prior art. Reed, for example, in his U.S. Pat. No. 2,727,782 shows a rigid and transparent deflector for use on the hood of an automobile. Stobar's U.S. Pat. No. 4,089,556 and the Johnson et al U.S. Pat. No. 4,331,358 both reveal shaped winglets mounted upon the side margins of a fairing or windscreen which roughly follow its contours, Stobar's being straight while that of the Johnson et al patent is, obviously, curved; nevertheless, any contouring necessary to match the shape of the windscreen upon which it is to be mounted is apparently done at the factory and no provision is made for the user to do it himself or herself so as to accommodate different fairings or operating conditions. The only flexible extension of which applicant is aware is revealed in Italian Pat. No. 643,237 which appears to include shapable areas in the upper righthand and lefthand corners; however, the curtain material is clearly a thin transparent sheet which would be incapable of maintaining anything like a precise contour unless framed all the way around, certainly not if supported at spaced points along one edge.

Planar and unshapable hinged winglets are old in the art, examples U.S. No. appearing in the U.S. Pat. No. 4,309,056; to Long Galloway 2,816,795; and Boudinot U.S. Pat. No. 3,791,313, along with the foreign patents to Gutscher (Austria) No. 18,811; and the three British Pat. Nos. 241,692; 248,533; and 208,888, the first two being Brooks et al patents while the last one was issued to Corah. Even hinged winglets using ball-and-socket connections are old, examples being found in Thorp's U.S. Pat. No. 2,062,483. No one, to applicant's knowledge, however, has combined the features of a bendable transparent winglet with two or more uniquely-designed mounting subassemblies having the capability of being adjusted independently of one another and releasably locked in place by the user so as to establish and maintain a chosen contour fitting a given, but transient, set of driving conditions. Moreover, this can be accomplished without having to drill or otherwise mar the finish of the windscreen. Such winglet assemblies may be offered as customized accessories for use with a particular windscreen or, alternatively, for use as additions to any of the several available makes and models.

The mounting subassemblies themselves are unique in that they employ a clamshell type connector adapted for adhesive attachment to a marginal edge of the windscreen without having to drill or otherwise alter same. A peripherally-toothed post is carried by one of the leaves of the clamshell and it mounts a ball-carrying arm that has an internally-toothed split ring on the end opposite the ball which is angularly adjustable relative to the post by means of a ratcheting action without having to disassemble and reassemble the two in a different angular relationship. A second adhesively-backed connector element attaches to the winglet and carries as a part thereof a jaw-forming socket sized to receive the ball and squeeze it so as to maintain an adjusted position when the jaws of the socket are tightened down thereagainst.

It is, therefore, the principal object of the present invention to provide a novel and improved shapable winglet assembly for use with windscreens on motorcycles, snowmobiles and the like as a means for achieving precision management of the air flow.

A second objective is the provision of an assembly of the character described which can be custom fitted but is essentially universal in its ability to be adapted to the many makes, models and sizes of commercially-available windscreens.

Another object of the within-described invention is that of providing mounting subassemblies having a unique construction which permits near universal adjustment thereof relative to a supporting surface without having to disassemble and reassemble any of its component parts.

Still another objective of the invention herein disclosed and claimed is the provision of two or more of the aforesaid mounting subassemblies which are capable of cooperating with one another and with a bendable transparent winglet to which they are fastened in spaced relation to permit the user to contour the resulting winglet assembly so as to match the contour of the windscreen from which it depends.

An additional object is that of providing a mounting subassembly containing an externally-toothed post and internally-toothed split ring interconnected for ratchet-like angular adjustment while in assembled relation.

Further objects of the invention are to provide an air-control winglet assembly for use as an extension to a windscreen that is versatile, lightweight, easy to mount and adjust, rugged, safe, relatively inexpensive and quite decorative in appearance.

Other objects will be in part apparent and in part pointed out specifically hereinafter in connection with the description of the drawings that follows, and in which:

FIG. 2 is an exploded perspective view to a greatly enlarged scale showing one of the single-arm mounting subassemblies in various angularly-adjusted positions relative to the clamshell connector and also in some universally-adjusted positions by virtue of the ball-and-socket connection on the other end thereof;

FIG. 3 is a fragmentary elevational view to the same enlarged scale as FIG. 2 portions of which have been broken away and shown in section to more clearly reveal the construction of the jaw-forming socket;

Figure 4:
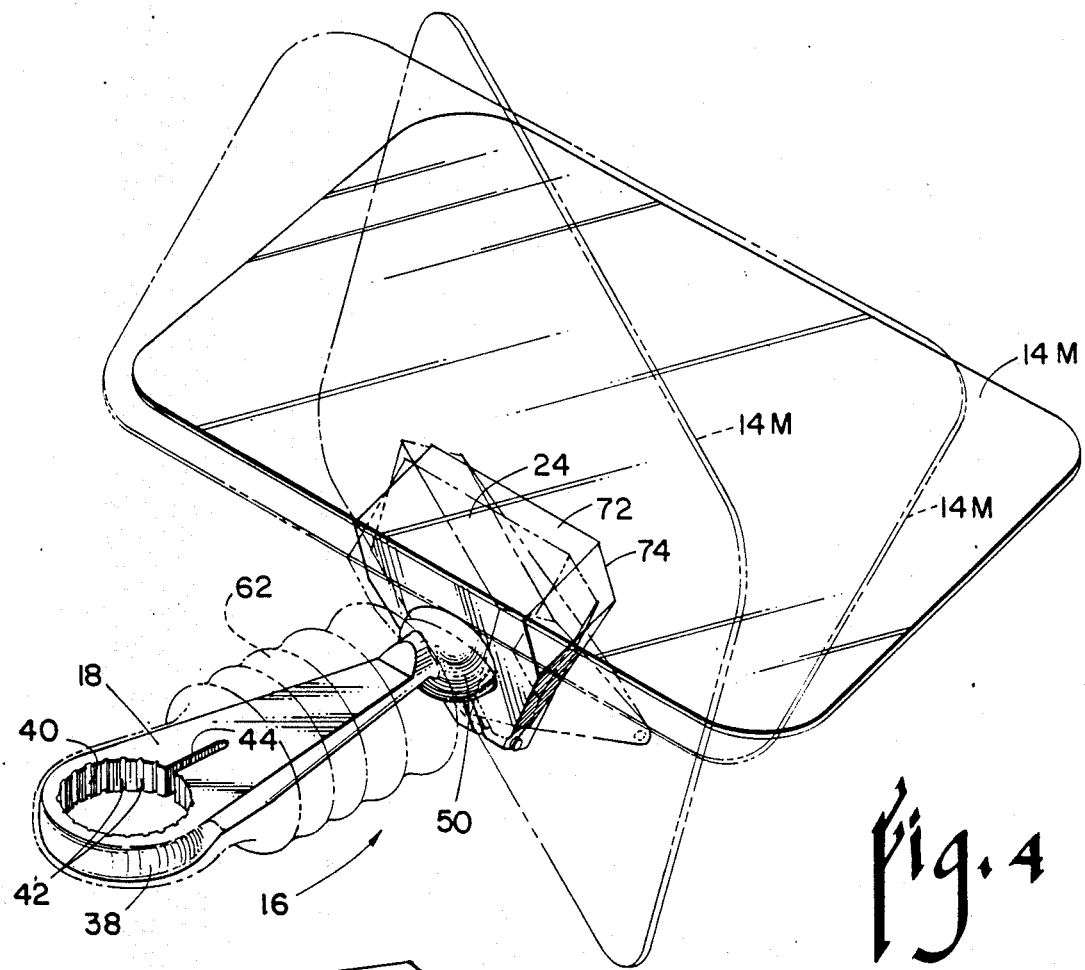
Figure 5:
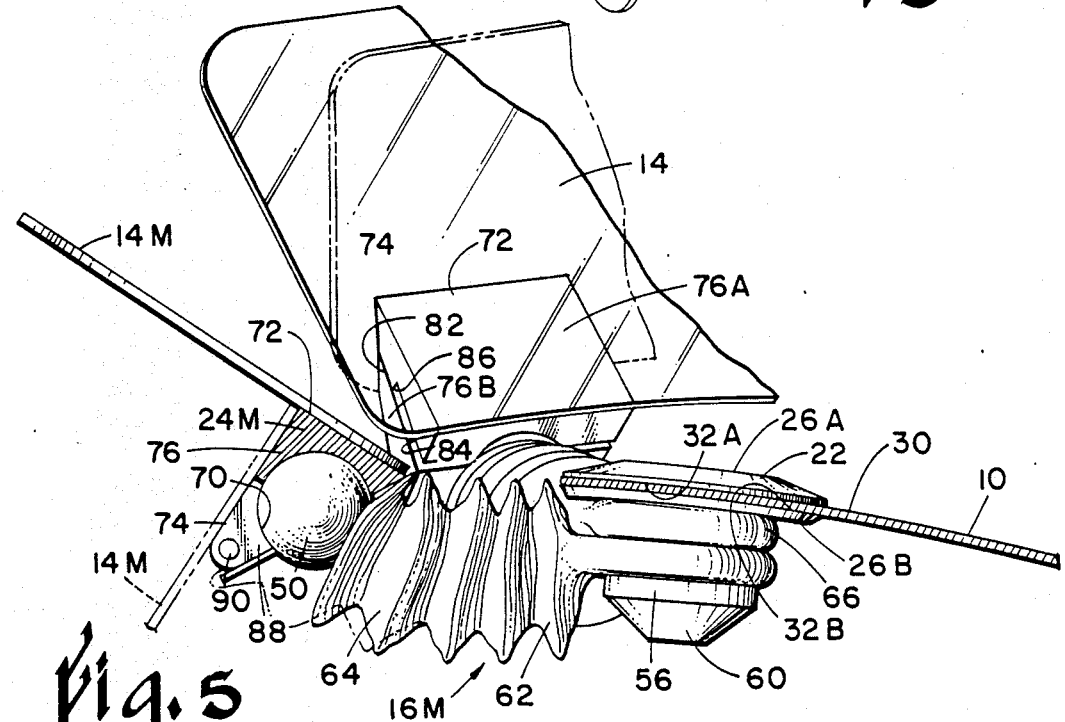

FIG. 4 is a perspective view to the same scale as FIGS. 2 and 3 showing in full and phantom lines the universal adjustability of a winglet using the ball-and-socket connector on one end of one of the single-arm mounting subassemblies; and, FIG. 5 is an elevational view very similar to FIG. 3 and to the same scale but differing therefrom in that a double-arm connector subassembly supporting a pair of winglets of different sizes has been substituted for the single-armed one of FIG. 3.

Figure 1:
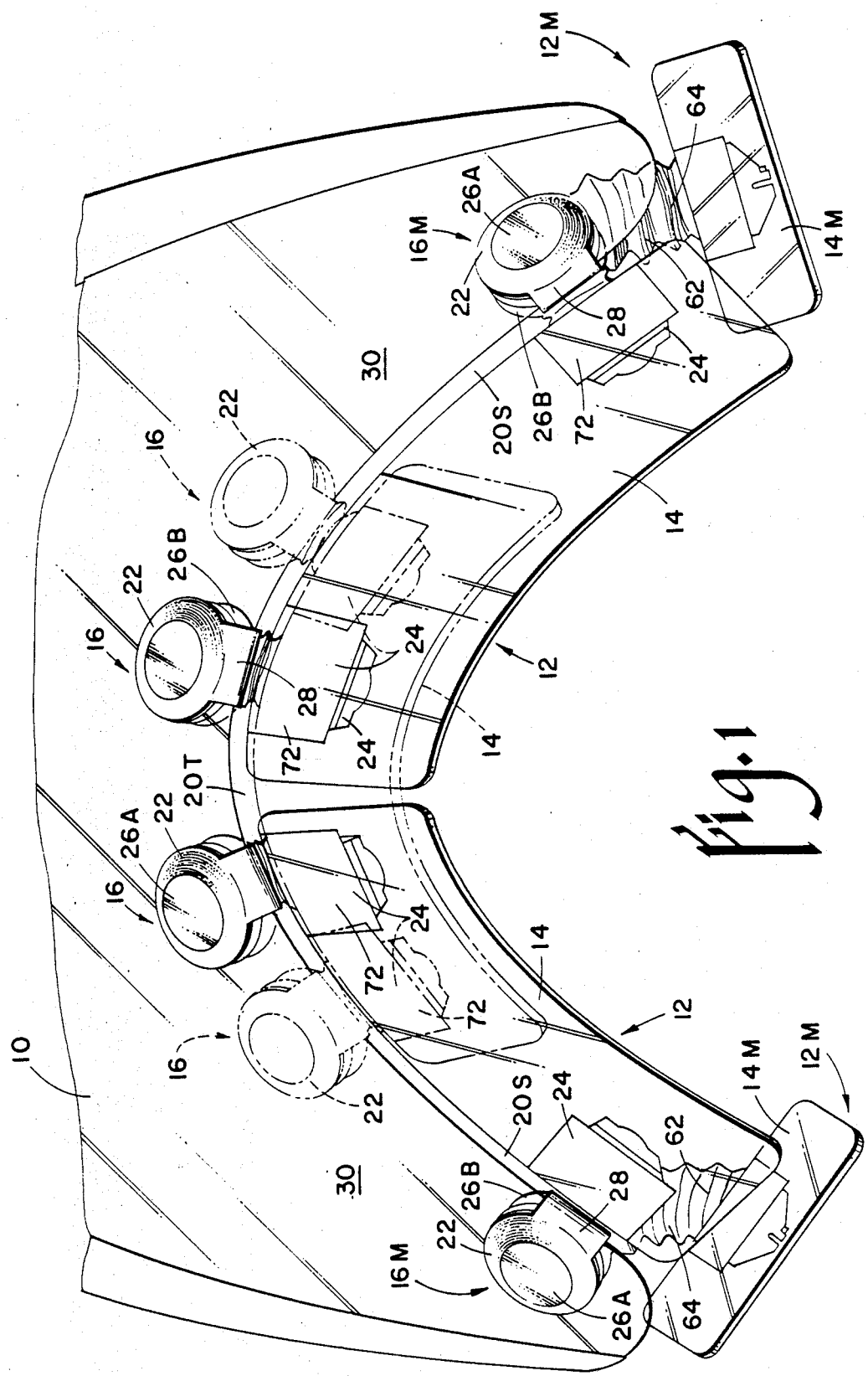
FIG. 1 is a fragmentary perspective view showing the trailing top edge of a concavo/convex transparent windscreen of conventional design to which are attached one or more winglet assemblies forming matching contoured extensions thereof.

Referring next to the drawings for a detailed description of the present invention and, initially, to FIG. 1 for this purpose, reference numeral 10 denotes a conventional contoured windscreen of the type used in motorcycles, snowmobiles and the like while reference numeral 12 broadly identifies one type of winglet assembly consisting of a bendable sheet winglet 14 preferably made of some type of transparent plastic material together with one or more mounting subassemblies that have been indicated in a general way by reference numeral 16. A slightly modified form of the winglet 14M is shown in the lower right and lefthand corners of FIG. 1 attached to the outside corners of the fairing or windscreen 10 by means of an alternative form of the mounting subassembly 16M having two arms instead of just one. These arms are most clearly revealed in FIGS. 2 and 4 to which detailed reference will be made presently. As far as what is shown in FIG. 1 is concerned, it will be apparent that, in the particular form illustrated, the arm attached to the main winglet 14 is somewhat shorter than the second 18 arm attached to the smaller winglet 14M. They can, of course, be the same length but, regardless of length, their construction is otherwise identical.

The winglet assembly 12 shown in phantom lines in phantom lines in FIG. 1 has been shown centered between the side margins of the windscreen and placed along the top edge 20T thereof where the curvature in the one illustrated is the greatest. Two single-arm mounting subassemblies 16 have been shown attached to the winglet 14 on opposite sides of the windscreen's vertical centerline. With the clamshell-type connector 22 clamped in place along the top edge 20T of the windscreen, the socketed connector 24 on the opposite end of arm 18 which are attached to the winglet 14 enable the latter to be bent and shaped to match the adjoining contour of the windscreen as shown or, alternatively, to be bent and held in some other configuration in accordance with the wishes of the user such as, for example, deflecting air past or against the body of the rider.

Represented in full lines in FIG. 1 is an alternative mounting in which two of the larger or main winglets 14 are combined with a pair of the smaller ones 14M and fastened to the side margins 20S of the windscreen 10 using one single-arm mounting subassembly 16 at the upper end and a dual-arm subassembly 16M at the bottom. The single-arm mounting subassembly uses a shorter version of arm 18 which has not been specifically illustrated. It is this same shorter arm that is used in the dual-arm subassembly 16M to connect the larger winglet 14 to the windscreen so as to match the one on the single-arm mounting subassembly. The longer arm 18, on the other hand, has been shown being used to connect the smaller winglets 14M to the lower end of the larger one. The latter smaller winglets are shown turned in the attitude of deflectors effective to take the air coursing around and past the windscreen and carry it into the rider's body. Conversely, the larger of the winglets 14 are both shown contoured, once again, to match the contour of the side margins 20S of the windscreen thus defining extensions or rearwardly-extending continuations thereof. It is significant to note in this connection that the side margins 20S of the particular windscreen illustrated are not uniformly curved, but instead, have a greater curvature at the top than at the lower edge; nevertheless, when properly adjusted and secured in adjusted position, it is still possible to match very closely such a compound curvature. As a matter of fact, shallow S-curves are easily achieved. The important thing to remember is that by using a bendable, but not overly flexible, sheet material to form the winglet and then attaching two or more of the mounting subassemblies 16 or 16M thereto, complex curves can be achieved and altered at will to bring about both stable and comfortable wind management experienced under different driving conditions.

Directing the attention next to FIGS. 2 and 3, the clamshell-type connector 22 will be seen to comprise a pair of leaves 26A and 26B interconnected by along adjacent edge portions by an integrally-formed hinge member 28. The connector shown is a molded plastic part preferably sufficiently flexible to conform to nonplanar windscreen surfaces 30 likely to be found adjacent the trailing edge 20 thereof. The opposed inside surfaces 32A and 32B of the leaves are preferably both coated with an adhesive (34 in FIG. 2) of a type adapted to more or less permanently fasten the connector 22 to the inside and outside surfaces 30 of the windscreen. Such adhesives are oftentimes of the non-drying type overlayed with a protective cover (not shown) which is stripped off and disposed of just prior to use. The use of adhesives negates having to drill the windscreen in order to mount the clamshells although, obviously, the use of a suitable fastener passed through the windscreen and both leaves of the clamshell provides an alternative mounting method.

One of the two clamshell leaves 26B carries an integrally-formed post 34 seen only in FIG. 2. This post is externally-toothed as shown at 36 to receive the internally-toothed split ring 38 formed on one end of arm 18.

The teeth 40 inside ring 38, however, are much shorter, flatter and even somewhat wider than the teeth on the post thus cooperating with the relatively shallow and much narrower grooves 42 therebetween to define somewhat of a multi-sided polygon. There are, preferably, the same number of teeth inside the ring as there are on the outside of the post with the relationship therebetween being such that the former will enter the grooves between the latter, i.e. when the grooves between the teeth on the ring lie atop the teeth on the post, the teeth inside the ring will bridge the gaps between the teeth of the post. The teeth 40 inside the ring as thus formed cooperate with a slit 44 in the edge of the ring extending a short distance along arm 18 to allow the ring to expand very slightly as the ring teeth ride up and over the much more pronounced teeth 36 on the outside surface of the post. The net result is a ratcheting action that allows the ring to be rotated on the post without having to disassemble and reassemble same in order to accomplish relative angular adjustment between the arm 18 and the clamshell connector 22. On the other hand, once the teeth inside the ring lie in the previously-described position bridging the grooves between the teeth on the post, the slit 44 in the ring closes slightly causing the latter to become somewhat smaller and grip the post thereby maintaining the adjusted angular relation therebetween.

An internally-toothed spacer ring 46 is also preferably used on the post when only a single arm is mounted thereon as shown in FIGS. 2 and 3. The thickness of this ring is roughly that of the integrally-formed ring 38 on one end if the post 18 and it thus takes up the space occupied by the ring on a second arm such as has been shown in FIG. 5. The teeth 48 (FIG. 2) inside this spacer ring complement those bordering the post and, therefore, relative rotational movement therebetween in assembled relation is prevented, there being no need for it. In the preferred embodiment of the invention, the arm 18 is angled slightly with respect to the plane of its ring 38 as can be seen in FIG. 3 where the center of ball 50 is offset a few degrees beneath a plane running through the center of its ring. Thus, by turning the arm upside down with respect to the position in which it is shown in FIG. 3 and into the position in which it is seen in FIG. 5, the ball 50 can be raised up approximately a half inch or thereabouts. Also, by placing the spacer 46 on top of the arm instead of beneath it as shown in FIGS. 2 and 3, the center of the ball can be moved even farther to one side of the supporting surface 30 of the windscreen. The small dogleg in the arm and the location of the spacer thus cooperate with one another to provide the user with a range of positions of the winglet 14 as far as alignment or misalignment with the adjacent edge of its supporting structure totally without regard to its tilt or angular relation to the latter. This feature is especially useful when the rider wishes to offset the winglet outside the surface of the windscreen to redirect some of the air flowing over the trailing edge of the latter into the pocket therebehind for cooling purposes.

Turning attention briefly to FIG. 3, it can be seen that the post is hollow and internally-threaded as indicated at 52 to accept the threaded shank 54 of cap screw 56 which holds the assembly together. This cap screw carries a kerf 58 in the head 60 thereof. It, like the other components of the mounting assembly are advantageously molded from a plastic material with the exception of the accordian-pleated boot 62 which covers the arms and is best made of rubber due to the requirement that it be quite flexible and elastic so as to stretch and accommodate the ring 38 as well as foreshortening as shown in FIG. 3 to expose the ball 50 and its socketed connector 24. As illustrated the accordian-pleated body 64 of the boot 62 covers the arm 18 and allows it to assume its various alternative positions previously described. An integrally-formed internally-channeled arch 66 stretches to accommodate and house the ring 38. Thus, while of little, if any structural significance, boot 62, nevertheless, provides a definite decorative touch and, in addition, is utilitarian in that it protects the several closely-mated parts housed therein from the ravages of dirt and moisture.

Ball 50 on the opposite end of arm 18 from the internally-toothed ring 38 is, likewise, shown as being slightly offset from the centerline of the arm as is most apparent from FIG. 3. By thus offsetting the ball, it cooperates with the dogleg in the arm to provide a further shift of the winglet 14 to one side or the other of its support 10. As shown, these offsets are additive and they cooperate with the location of the socket 70 in socketed connector 24 to enable the adjacent edges of the windscreen and the winglet to be placed in substantial edge-to-edge alignment with one another when the latter element is attached to mounting surface 72 as shown most clearly in FIG. 3.

In FIGS. 3 and 5 of the drawing, it can be seen that the socketed connector when in assembled relation has two potential winglet mounting surfaces 72 and 74 disposed in intersecting angular relation to one another. While in each of the several figures of the drawing, the winglets have been shown mounted on planar surface 72, they could, just as well be mounted on the other one 74 as indicated in phantom lines in FIG. 5. Within the limits of universal adjustment of the ball-and-socket connection defined by ball 50 and the socketed connector 24, this alternative mounting position for the winglet opens up a wide range of wind-management options unavailable with one position alone. As was the case with clamshell connector 22, the preferred way of attaching socketed connector 24 to the winglet is with an adhesive so as to eliminate the need for hole-drilling, having to use fasteners with exposed sharp edges that become prospects for causing injury and other disadvantages of more or less an aesthetic nature.

Two alternative embodiments of the socketed connector have been shown in the drawing, the first identified by numeral 24 having two separate jaw-forming parts 76A and 76B while the second (24M) shown only in FIG. 5 has but one slotted jaw-forming member 76. In the two-part connector 24, jaws 76A and 76B each include mating portions of the ball-receiving socket 70 which, when drawn tightly together by self-tapping fasteners 78 grip the ball 50 therebetween. These fasteners pass essentially unobstructed through slightly oversize holes 80 in part 76A before screwing into smaller holes (not shown) in the underside of part 76B after passing alongside the ball-receiving socket 70 as seen in FIG. 2. The underside 82 of part 76B is step-cut as shown at 84 along the blind end of the ball-receiving socket 70 to enable it to tilt or rock about the fulcrum-forming riser portion 86 of the step thus enabling it to engage and grip the ball 50 when seated in the socket. Loosening of fasteners 78, of course, opens the jaws of the socketed connector 24 and allows for limited universal movement of the ball 50 therein for purposes of tilting and otherwise adjusting the winglet 14 relative to its supporting structure.

Finally, with particular reference to FIG. 5 where the alternative embodiment of the socketed connector 24M has been revealed in position carrying one of the small winglets 14M on its longer arm 18, part 76 containing the ball-receiving socket 70 will be seen to have a slot 88 opening onto the aforementioned socket and intersected by a fastener 90 traversing the slot which is effective upon rotation in one direction to tighten same and narrow the slot thus pulling the jaw-forming portions on opposite side thereof closer together while at the same time reducing the size of the ball-receiving socket or pocket to one which will grip the ball and prevent relative movement of the latter therein. The two-part connector 24 is preferred over the one just described for the reason that the socket can be made to accept more of the spherical surface of the ball and still be a simple matter to assemble. The one-part unit, on the other hand, is limited to just slightly more than a hemispherical socket which can be opened up enough to receive the ball due to the limits on how wide the slot 88 can be spread open.

What is claimed is:

1. The mounting assembly for adjustably connecting accessories to an edge of a windscreen which comprises: a non-invasive adhesive-faced clamshell-type connector having a pair of leaves joined by an integrally formed hinge member and clampable to an edge of a windscreen; peripherally-toothed cylindrical post-forming means depending from said clamshell-type connector; at least one rigid arm having a ball on one end and an internally-ribbed expandable ring on the other end thereof sized and adapted to fit over the post-forming means and cooperate therewith to permit incremental relative rotational movement therebetween with an inhibited ratchet-like action while assembled; and a socketed connector mounted on the ball for limited universal movement, said connector including means for attaching same to an accessory which is to be both tilted and swung in an arc relative to the windscreen.

2. The mounting assembly as set forth in claim 1 in which: the arm is tilted in acute-angular relation to axis of rotation of the ring.

3. The mounting assembly as set forth in claim 1 which: the socketed connector includes a pair of opposed jaws cooperating to define a socket therebetween for receiving the ball, said jaws being movable from a loosened position housing said ball for relative movement therein to a clamped position in fixed relation to one another, and actuating means interconnecting said jaws for moving same between loosened and clamped position.

4. The mounting assembly as set forth in claim 3 in which: the jaws are integrally-formed and springable between a normally-open loosened position into their clamped position.

5. The mounting assembly as set forth in claim 1 in which: the arm has a centerline and said centerline is offset to one side of the center of the ball.

6. The mounting assembly as set forth in claim 5 in which: the centerline of the arm is tilted in acute-angular relation to the axis of rotational movement of the ring; and in which the ball has a center and said center is offset toward the ring.

7. The mounting assembly as set forth in claim 1 in which: a second arm is mounted on the post-forming means stacked atop the first of said arms, said two arms being independently arcuately-movable on the post and independently movable relative to one another.

8. The mounting assembly as set forth in claim 7 which: the second of the two arms is shorter than the first.

9. The mounting assembly as set forth in claim 8 in which: both of said arms have centerlines lying in acute-angular relation to the axis of rotation of the ring, and in which said centerlines are arranged in divergent relation to one another.

10. The mounting assembly as set forth in claim 8 in which: both of said arms have centerlines lying in acute-angular relation to the axis of rotation of the ring, and in which said centerlines are offset in the same direction.

11. The mounting assembly as set forth in claim 1 in which: the inside of the ring is polygonal.

12. The mounting assembly as set forth in claim 11 which: the polygonal surface of the ring has the same number of sides as the post has teeth.

13. In combination in a shapable windscreen extension: a bendable sheet of material sufficiently rigid to maintain its shape when supported along one edge and a pair of connector assemblies for attaching same to an edge of a windscreen, said assemblies each including a first connector subassembly fastenable to said windscreen edge, an arm depending from said first connector subassembly having a ball on the remote end thereof, and a second connector subassembly fastenable to said bendable sheet and to said ball, said second connector subassembly including a clampable socket mounted upon said ball for limited universal movement relative thereto when loosened so as to bend and shape said bendable sheet, said second connector subassemblies when arranged in spaced relation to one another along the edge of the bendable sheet and clamped in fixed position upon their respective balls cooperating with one another and with the windscreen which functions as a support therefor to maintain said sheet in a fixed contoured relation relative to said windscreen as thus preshaped.

14. The combination as set forth in claim 13 in which: the first connector subassemblies comprise clamshell-type units having hingedly-interconnected leaves.

15. The combination as set forth in claim 13 in which: the clampable socket of the second connector subassemblies have spring jaws movable from a loosened position allowing for relative movement of the ball therein and a clamped position tightened in fixed position thereagainst.

16. The combination as set forth in claim 13 in which: a post depends from each of the first connector subassemblies, and in which the arms have a ring on the end thereof opposite the ball sized and adapted to fit down over the post and interconnect same for relative arcuate movement.

17. The combination as set forth in claim 16 in which: the posts are cylindrical and each is peripherally toothed, and in which the ring is polygonal on the inside thereof, said polygonal surface cooperating with the teeth on the post to permit incremental relative rotational movement between said arms and their respective posts with a ratchet-like action.

* * * * *